United States Patent [19]

Kinser, Sr.

[11] 4,156,984
[45] Jun. 5, 1979

[54] MARINE LIFE TRAP

[76] Inventor: Warren H. Kinser, Sr., P.O. Box 1726, Kodiak, Ak. 99165

[21] Appl. No.: 771,795

[22] Filed: Feb. 24, 1977

Related U.S. Application Data

[63] Continuation-in-part of Ser. No. 636,588, Dec. 1, 1975, abandoned.

[51] Int. Cl.² ............................................. A01K 69/10
[52] U.S. Cl. ...................................................... 43/105
[58] Field of Search ................................... 43/100, 105

[56] References Cited

U.S. PATENT DOCUMENTS

| | | | |
|---|---|---|---|
| 1,447,502 | 3/1923 | Asanio et al. | 43/100 |
| 1,958,724 | 5/1934 | Stanislaw | 43/100 |
| 2,586,350 | 2/1952 | Lamb | 43/105 |
| 3,380,187 | 4/1968 | Werstlein | 43/100 |
| 3,508,358 | 4/1970 | Lee | 43/105 X |

FOREIGN PATENT DOCUMENTS 1280730  11/1961  France ........................................ 43/105

*Primary Examiner*—Louis G. Mancene
*Assistant Examiner*—Daniel J. Leach
*Attorney, Agent, or Firm*—Clarence A. O'Brien; Harvey B. Jacobson

[57] ABSTRACT

A trap for marine life having a top member of annular configuration with the center area covered with netting, a similarly configured bottom member also covered across the center area with netting, and similarly configured intermediate members provided with side netting extending between said top and bottom members. An elastic member is provided substantially midway of the side netting for the purpose of effecting collapse thereof and to keep the side netting folded in an orderly manner when collapsed. In one embodiment, flexible ropes interconnect the top and bottom members. In other embodiments, guide structure connects between the top and bottom members to provide guide channels in which at least one of the intermediate members supporting the collapsible side netting may move. Additional side netting structure may be provided suspended from the top member for covering any gaps between the said top member and the side netting when only partially closed. Additional features include a double eye rope loop terminal member, double cross rods supporting a double reflector type chemical light for attracting marine life to the trap, and various insulating and noise deadening features associated with the trap. The guide channel structural elements are provided in various forms including rigidly attached rods, removable rods with special guides and catch retainer members, and pivotally mounted and foldable guide rod devices.

55 Claims, 34 Drawing Figures

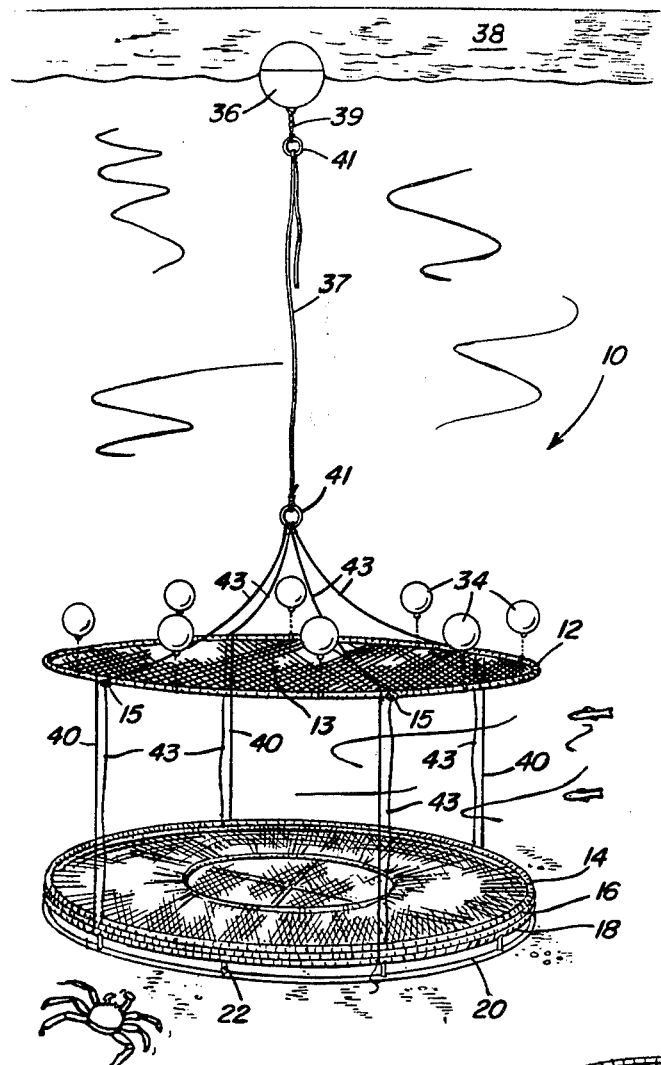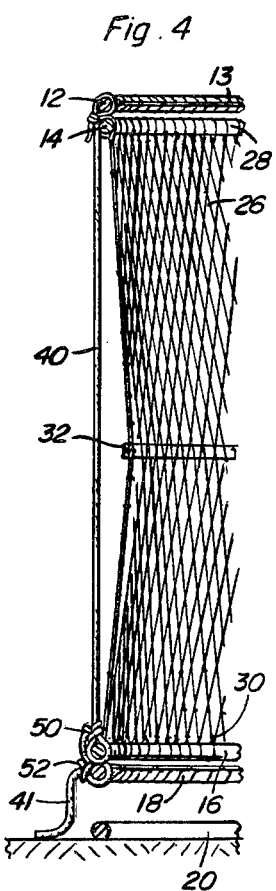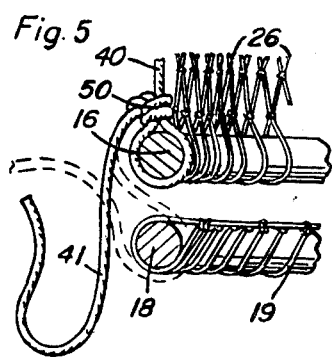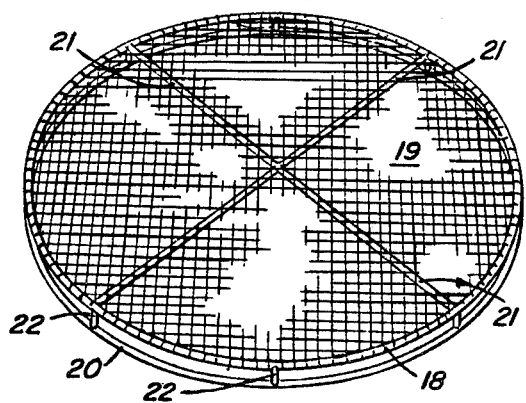

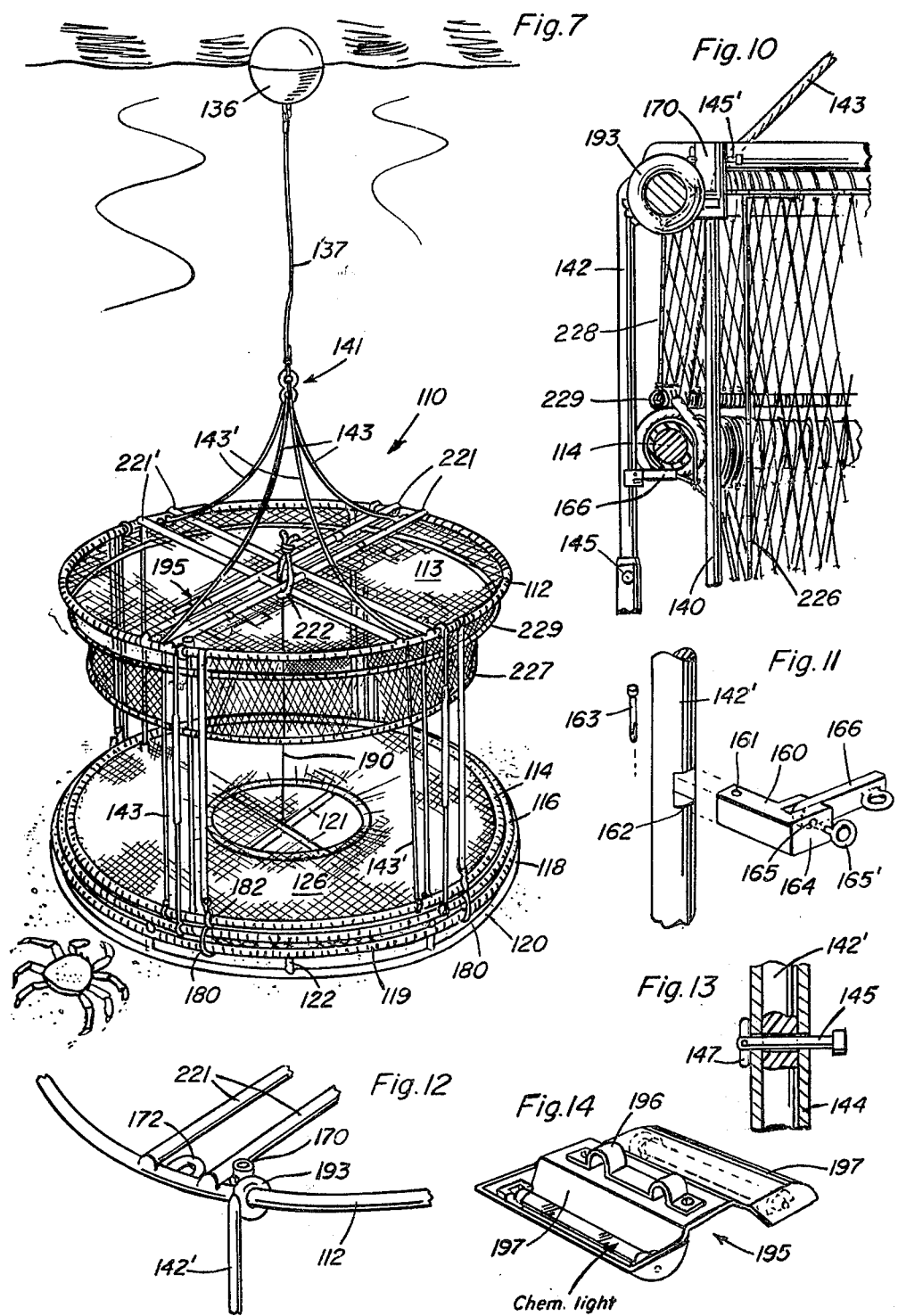

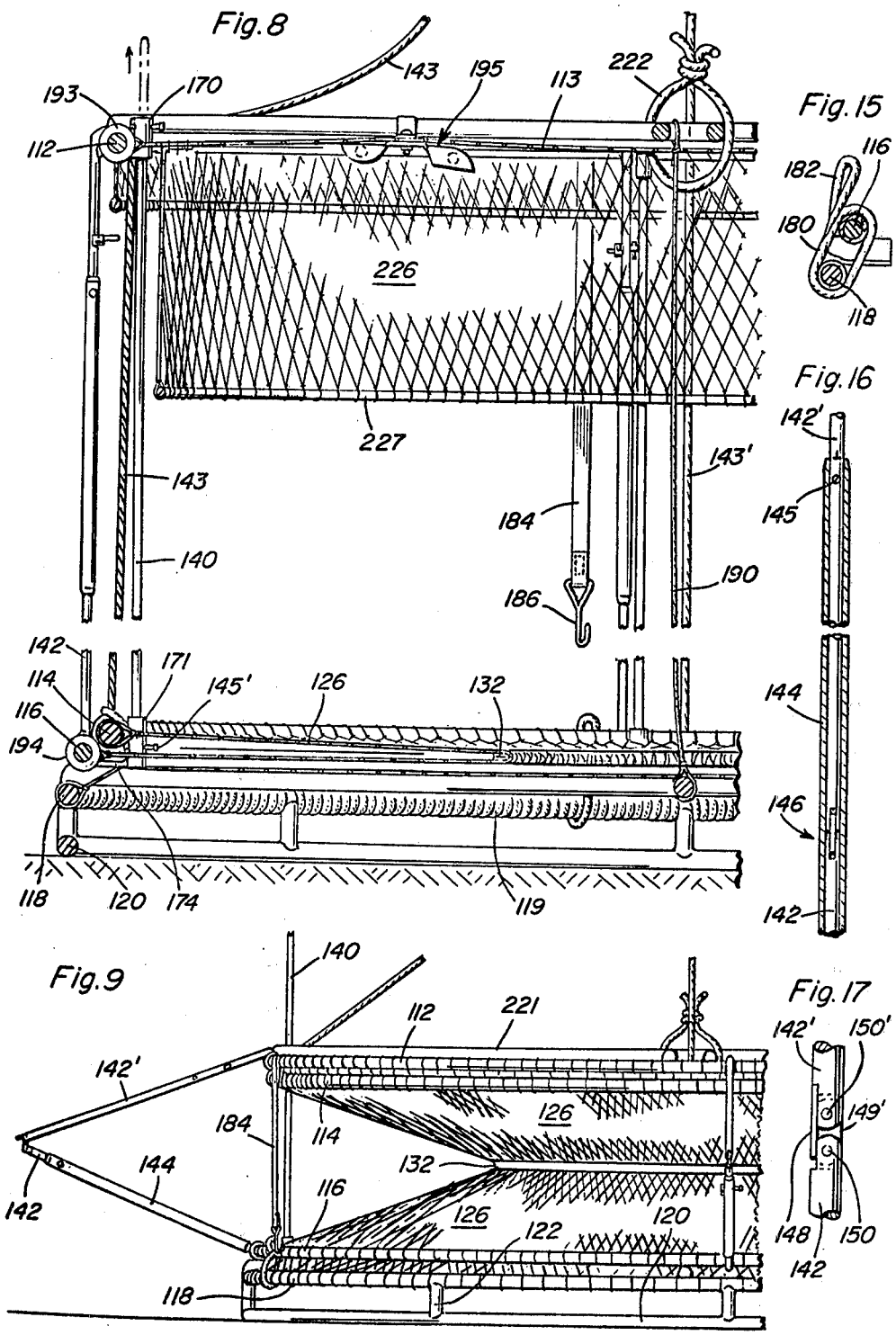

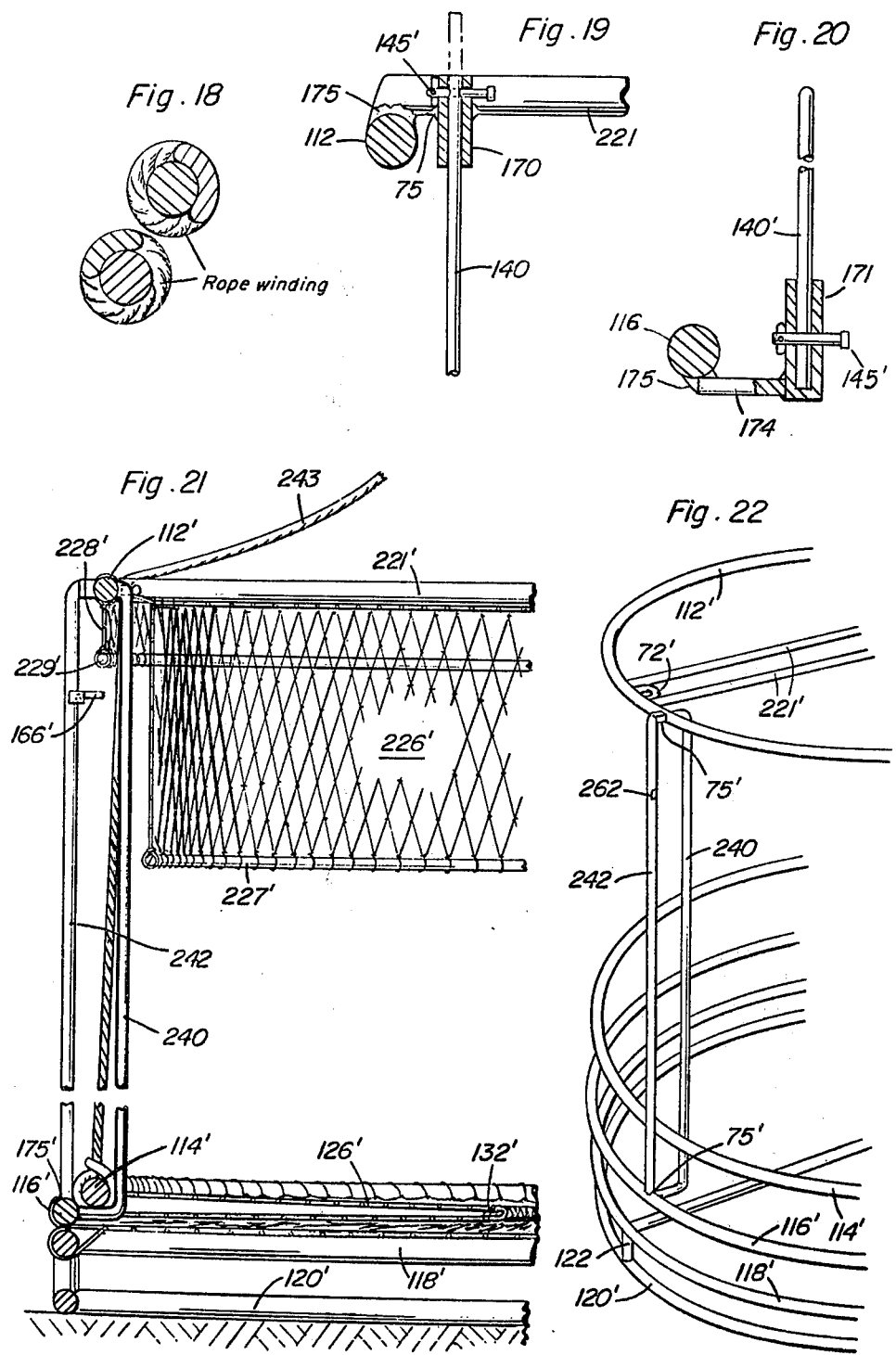

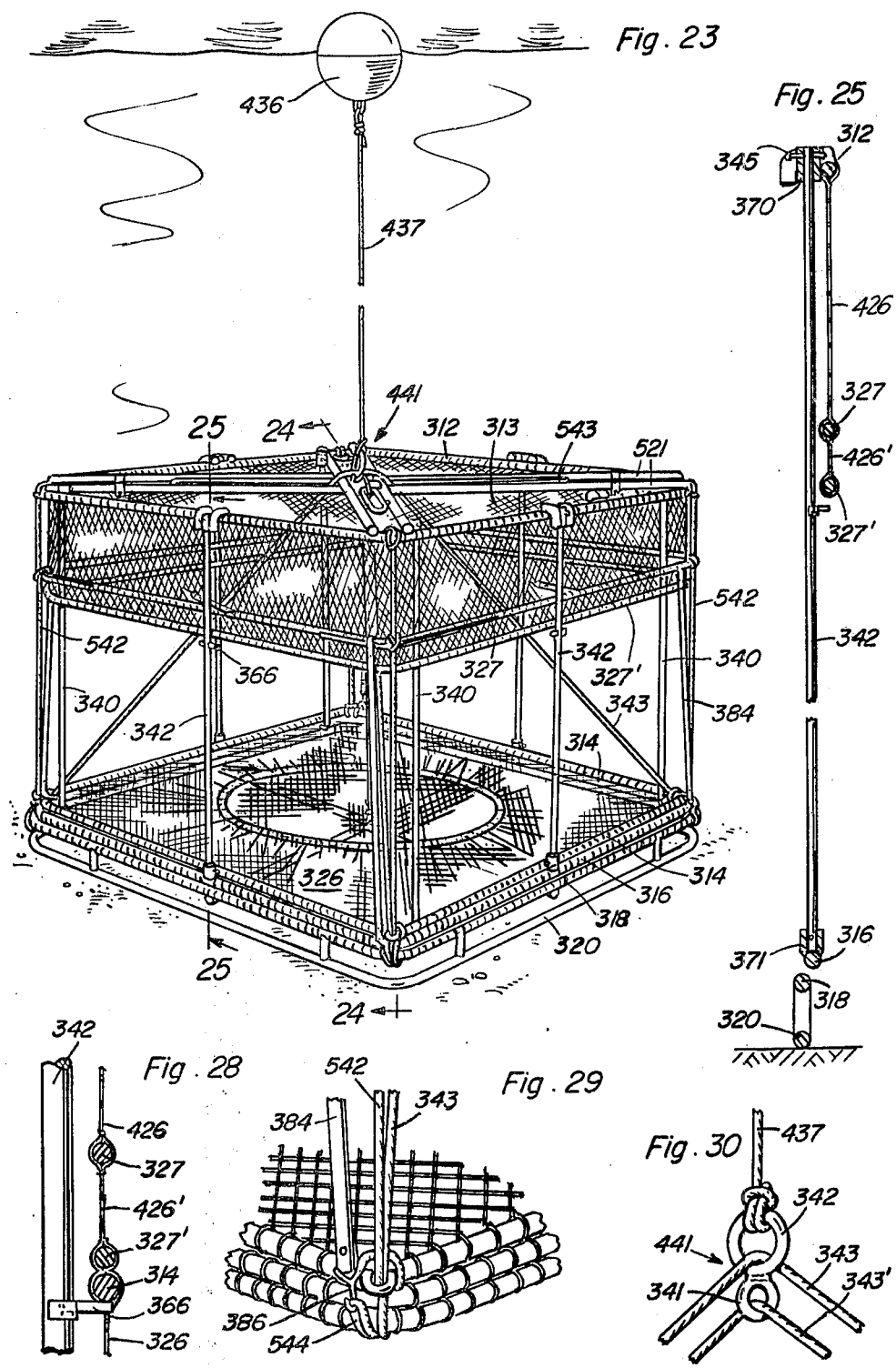

MARINE LIFE TRAP

CROSS REFERENCE TO RELATED APPLICATION

This application is a continuation-in-part of U.S. application Ser. No. 636,588, filed Dec. 1, 1975, for FISH TRAP, now abandoned.

BACKGROUND OF THE INVENTION

This invention relates generally to marine life traps as used for catching various species of marine life.

DESCRIPTION OF THE PRIOR ART

Known type traps for catching various species of marine life have a number of disadvantages. One problem with known type devices is that the traps have relatively large obstructions in the path of the desired species which deters same from being caught in the trap and their fixed entrances also offer escape routes.

Another problem with known type traps is that they are basically of rigid construction and as such take up quite a volume of space. This is especially undesirable aboard the average fishing vessel where space is at a premium. Of known type traps, in order to disassemble, fasteners must be removed which structure is either unduly complicated, quite fragile, or after a short period of use becomes inoperable.

The prior art of record in copending application Ser. No.636,588 illustrates the known developments in this field of endeavor.

SUMMARY OF THE INVENTION

An object of the present invention is to provide an improved trap wherein when the trap is set up for use it will offer a substantially open structure for marine life to enter said trap. Then, the trap may in turn be closed to catch the marine life therewithin and prevent their escape therefrom in a positive and secure manner. The trap is less expensive in overall operation, requires less effort and less raw materials, is much more effective in operation, can be very easily removed or dumped into the hole of a fishing vessel, can be closed from above the surface of the water being fished, and if lost will not trap fish therein or other marine life as do conventional traps with the resultant waste of such marine life.

Another object of the present invention is to provide a semi-rigid trap which when assembled for use will occupy a fairly large volume of space, but may be easily and readily substantially reduced in size for transporting and storage purposes.

A further object of this invention is to provide a trap having a substantially enclosed top and bottom member with said members supported spaced apart by means of guide channel structure attached respectively thereto. Collapsible and expandable side netting is provided between two more members of similar configuration to the top and bottom members and arranged for guiding movement between said top and bottom members within the guide channel structure. An elastic band is provided for the side netting in order to effect the collapsing function thereof in a neat, orderly manner without presenting any obstacle to entry by marine life.

Another further object of this invention is to provide rope loops for the actuation of the net erection and collapsing structure having a double eye terminal end structure so arranged as to prevent inter-engagement and inter-locking of the rope loops and to lift the side netting evenly.

An additional object is to provide removable or collapsible guide channel structure for association with the trap as disclosed which permits said trap to be collapsed and substantially reduced in volume for storage thereof.

A further still additional object is to provide lighting structure usable with the trap which will illuminate bait suspended within the trap as well as illuminating the surrounding waters in order to attract various species of marine life to the trap.

Additional further objects are to provide insulating and sound deadening coverings for decreasing electrolysis between component parts as well as eliminating noise caused by said parts coming into contact with each other.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the marine life trap of this invention in use.

FIG. 4 is a cross-sectional view, in part, taken generally along line 4—4 of FIG. 3.

FIG. 5 is a detailed cross-sectional view of the lower left hand corner of FIG. 4.

FIG. 6 is a perspective view of the separable lower portion of the trap of this invention.

FIG. 7 is a perspective view of another embodiment of the trap of this invention as in the open, ready for trapping position.

FIG. 8 is a side elevational view, partly in cross section, of the trap embodiment of FIG. 7.

FIG. 9 is a side elevational view of the embodiment of FIGS. 7 and 8 in the partially collapsed position.

FIG. 10 is a fragmentary sectional view of the upper portion of the trap illustrating the latching mechanism.

FIG. 11 is an exploded perspective view of the one way latch pin and mount connection therefor.

FIG. 12 is a detailed perspective view of the pivot ring mount for the foldable side guide rods.

FIG. 13 is a cross sectional view of the retaining pin detail.

FIG. 14 is a perspective view of a chemical light per se.

FIG. 15 is a rope tie with attachment loop detail.

FIG. 16 is a guide rod pivot with locking sleeve.

FIG. 17 is a detailed showing of the guide rod pivot joint.

FIG. 18 is a detailed showing of rope winding covering.

FIG. 19 is a detail of a removable guide rod upper end securing feature.

FIG. 20 is a detail of a removable guide rod lower end securing feature.

FIG. 21 is a side elevational view of a rigid trap embodiment.

FIG. 22 is a fragmentary perspective view of the frame elements per se of the rigid fish trap embodiment of FIG. 21.

FIG. 23 is a perspective view of another embodiment of this invention.

FIG. 25 is a sectional view of a guide support rod, taken along 25—25 of FIG. 23.

FIG. 28 is an elevational view of the retaining pin latch mechanism.

FIG. 29 is a detail of the resilient catch strap connection.

FIG. 30 is a detail view of the upper cross rope double loop and terminal end eye ring structure.

DESCRIPTION OF THE PREFERRED EMBODIMENTS

Figure 2:
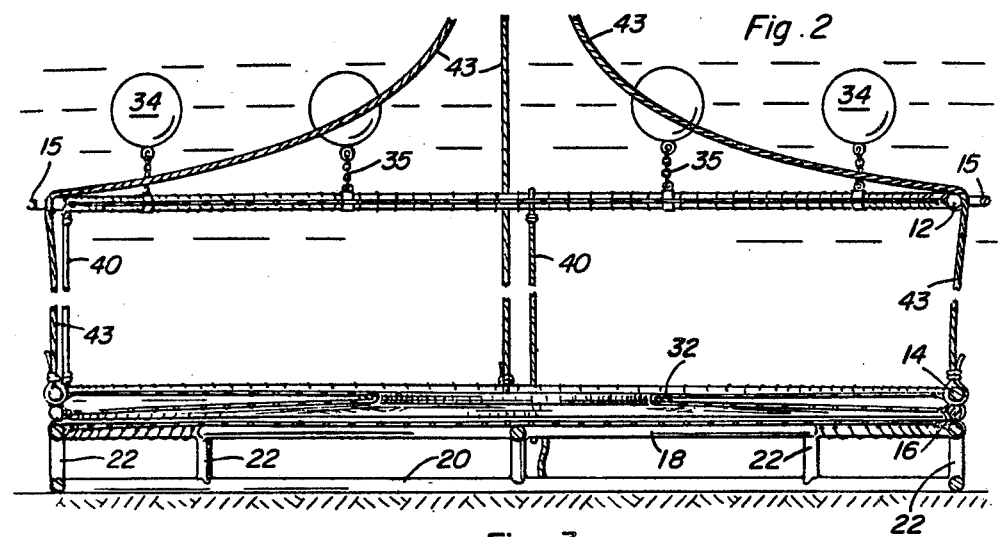
FIG. 2 is a vertical, sectional view of the trap as in use in the net collapsed trapping position.

Referring to FIG. 1 of the drawings, reference numeral 10 indicates the trap of this invention in the open position and as in use on the bottom of a fishing area. As shown, it is in its open or net collapsed position and is ready for entry of marine life to be caught. FIG. 1 depicts a king crab approaching the trap probably to be caught therein. Normally appropriate bait for the type of marine life sought would be attached to the center portion of the trap to lure the marine life into the trap. Such bait is not presently shown in the illustrations.

Figure 3:
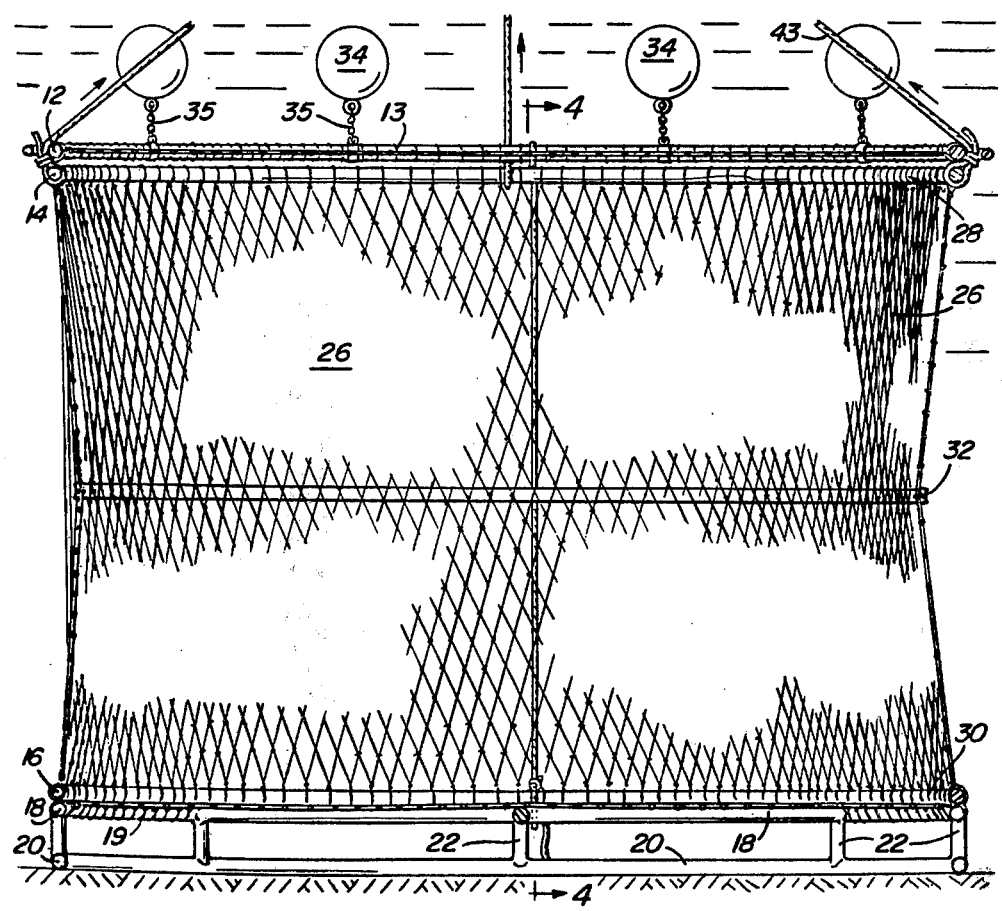
FIG. 3 is a vertical, cross-sectional view of the trap in the closed position ready to be hauled aboard a fishing vessel.

Looking at FIG. 3, the five annular rings which form the basic operating structure of this trap can be seen in cross section. The top ring 12 has netting covering the inner area thereof, labelled 13, and in normal operation said ring will float in a horizontal position supported by floats 34 suitably attached to said ring by connecting means 35. The next annular ring 14 has the upper edge of a sleeve-type net 26 attached thereto, as at 28. The third or middle ring 16 has the bottom or other end of the sleeve net 26 attached at 30 thereto. These two rings 14 and 16 and the sleeve net 26 form the working portions of the trap of this invention.

A large elastic member or rubber band 32 encircles the outer circumference of the sleeve net 26 at approximately the middle thereof as best seen in FIGS. 3 and 4. This rubber band 32 is under tension on the sleeve net so that when the upper ring 14 is allowed to drop, the rubber band 32 will cause the net to collapse as best seen in FIGS. 1 and 2. Thus, as can be visualized, the tension applied by the rubber band will keep the sleeve net 26 from becoming a large tangle of loose webbing, moving in the currents, that experience has shown certain commercial marine life will not enter, and allow it to be collapsed and extended at the will of the fishermen operating the net in an orderly fashion.

The bottom portion of the trap, depicted by itself in FIG. 6, consists of a fourth annular ring 18 appropriately covered in the center area thereof by netting 19 and reinforced by cross bars 21. Said fourth ring and net thereon and normally attached to the trap adjacent to the third ring 16 for completing the trap enclosure. As can be seen in FIG. 3 the upper ring 12 has netting to enclose the upper part of the trap, the sleeve net is extended to enclose the sides of the trap and the bottom ring 18 is attached to ring 16 to enclose the bottom of the trap. In order to prevent the netting 19 of the lower ring structure from becoming embedded in the bottom surface of the fishing area or being damaged by rocks or other objects on the bottom, the ring 18 is mounted on a support structure comprising a fifth ring 20 and short supports 22 of approximately one to five inches in height. The fifth and bottom ring 20 is open without any netting whatsoever and acts as supporting structure for the fourth ring 18 which is actually the ring which supports netting 19 to complete the bottom of the trap. When fishing for a species that prefers a lower entrance, the fifth ring may be omitted.

As mentioned previously, the top or uppermost ring 12 floats horizontally in the water suspended from float balls 34. The height this ring floats from the bottom rings of the trap is determined by rope members 40. These members 40 of appropriate length are braided rope or lines that flatten when pressed. They are attached at one end by a non-loosening, easily untied knot to the top ring 12 and the lower end of said ropes are appropriately tied with similar knots to ring 16, as best seen in FIGS. 4 and 5. Such knot 50 is shown in these figures for securing the rope 40 to the ring 16. Said ropes 40 are of sufficient length to leave an additional end portion 41 extending from the knot 50 after the rings 12 and 16 are connected by the ropes 40. As seen in FIG. 5, this end portion 41 can be looped around the fourth ring 18 and, as seen in FIG. 4, securely tied thereto by another knot 52 to firmly attach rings 16 and 18 together.

FIGS. 2, 3 and 4 of the drawings all show the use of two knots 50, 52 for lines 40 to hold rings 16 and 18 together. This of course causes a small gap to be present between said rings, as shown. Obviously, when fishing for small species of marine life, such as shrimp, this gap may be very undesirable. To eliminate the gap between rings 16 and 18 a single knot, not shown, may be used to tie both rings close together instead of the two knots. This embodiment is intended to be included in this invention.

In normal operation, rings 16 and 18 will be attached together as shown. It is this attachment of the rings 16 and 18 together by means of the rope and tie means which comprise another feature of this invention. As can be readily visualized, once the trap of this invention is closed, as in FIG. 3, and the over-all trap raised to the surface and brought aboard a fishing vessel, it is a very simple matter to loosen all of the knots 52 and thereby permit the bottom net 19 and rings 18 and 20 to rest on the deck of the vessel. The upper rings and netting thereon can then be lifted away from the bottom net 19 leaving the marine life caught therein easily accessible by the crew for selection of the wanted species and discard of the unwanted ones. Furthermore, if all of the catch is to be kept and dumped into the hold of the vessel, this also is easily accomplished by merely loosening two or three of the knots 52 and allowing the lower portion of the trap to open at these points about the hinge point formed by the remaining tie or ties. Thus, the entire catch can be easily dumped into the hold without completely separating the bottom of the trap or without manipulating extra doors or openings as is usual in conventional type fish traps. Obviously with three of the four tie points shown loosened and only one tie point remaining as a hinge point, an extremely large opening is provided at the bottom of the trap for complete easy discharge of the contents thereof.

When preparing to fish with this trap, it would normally be carried aboard the ship in the collapsed position, as can be visualized from looking at FIGS. 1 and 2, and once reaching the desired fishing site, the appropriate bait would be attached to the center portion of the netting and cross rods 21 and the entire structure dumped overboard. The floats 34 will cause the device to sink in a horizontal position and said device will come to rest as depicted in FIG. 1. Fish, king crabs, and other marine life then can easily enter the trap to get the bait without any obstructions other than the ropes 40 and 43 to encounter. The lines 43 are used to close the trap by raising the ring 14 and operate in the following manner. These lines 43 are shown as passing over the outer surface of ring 12 and being retained by rings 15 welded to ring 12 at the desired positions for the lines 43. Normally four such lines are employed, but three lines may be used, or more, if desired.

Another embodiment of this invention is for the lines 43 to pass through rings or eyelets welded or attached to the inner circumference of ring 12, thus reducing the strain on lines 43 because of a slightly more direct pull when line 37 is lifted to raise the ring 14. The lines 43 are attached to a ring 41 which is connected to another rope or line 37, another ring 41, connecting means 39 and a primary float 36 which normally is on the surface 38 of the body of water being fished. This primary float 36 is the one the fishing vessel returns to after an appropriate waiting time to permit the trap to catch some marine life. Upon return to the trap, the crew will pull in line 37 which will put the lines 43 under tension and lift the ring 14 to extend sleeve net 26 and close the trap as depicted in FIGS. 3 and 4. Obviously, the rubber band 32 is stretched to its outermost limit at this time. By further pulling of the line 37, the entire trap will be lifted off the bottom and can be raised to the surface and pulled onto the deck of the vessel.

FIGS. 7–20 illustrate another embodiment of the trap and as generally disclosed in FIGS. 1–6, a trap for catching marine life is preferably formed of a plurality of annular rings 112, 114, 116, 118 and 120. The top ring 112 and the next to the bottom ring 118 are provided with netting 113 and 119 across the open center thereof. In this embodiment, the upper rings are of smaller diameter than the lower ones to allow a greater telescopic collapse of the overall trap for storage purposes and to provide a more gradual climb for some marine life and to provide a lower center of gravity. The two members 112 and 118 basically provide the top and bottom portions of the trap, while the bottom ring 120 attached to the bottom covered ring 118 and mounted thereto by short stubs 122, keeps the bottom netting 119 a short distance above the surface bottom of the ocean, or other body of water which is being fished. The lower ring 118 may be provided with cross bars 121 much in the manner of the first embodiment. However, in this embodiment, pairs of cross bars 221 are provided at right angles to each other on the upper ring member 112 and above the netting therefor. These cross bars may be attached by appropriate welding or the like to the ring 112. Normally a rope loop 222 will be attached about the center junction point of these cross bars for engagement with a hoist hook aboard the fishing vessel in order to lower the trap while in the erected but open for fish catching position, as in the view of FIG. 7. Also attached to these cross bars may be lighting structure such as shown in FIG. 14 which will be described in detail below.

In this embodiment of the invention, rings 114 and 116 are of slightly smaller diameter than ring 118 so that in the position as shown in FIG. 7, the rings and associated side netting 126 will compress more completely in telescopic fashion to present a smaller obstruction to the marine life. Also, when the top ring 112 is lowered into engagement on top of rings 114, 116 and 118 for the purpose of storage and transporting aboard the fishing vessel, a more compact package will be provided. The elastic member 132 made of rubberized nylon material or the like will effectively bring the side netting 126 inwardly toward the center of the device while maintaining the netting in a relatively taut manner and prevent entanglement thereof. This can best be seen in the views of FIGS. 8 and 9.

The basic operation of the structure disclosed so far, is that after the open trap of FIGS. 7 and 8 has attracted a suitable amount of marine life, the fishing vessel will find the trap by means of the floating surface buoy 136 and pull on line 137 to in turn pull on loops or rope 143 and 143' as connected to line 137 by double eye connector 141. Thus pulling line 137 will lift the ring 114, which is the upper ring having the side netting 126 therearound, which will then move upwardly until closely adjacent to top ring 112. In the device of FIGS. 1–6, it has been discovered in actual practice that if there are heavy seas when the fishing vessel is pulling the closed trap aboard, occasionally slack will occur in line 37 allowing lines 43 to drop and thus allow all or a portion of the ring 14 to drop away from the top of the trap. Thus, trapped marine life may escape through the gap created by this separation. In the device shown in FIGS. 7–20, several structural features have been added to solve this problem. Additional side netting 226 and 228 is attached at appropriate points to the upper ring 112 and the central netting 113 supported thereby. Weighted rings 227 and 229 provide the necessary weight to the lower portion of these side nets to cause them to hang downwardly through gravity action. With these additional side nets, even if separation should take place between the rings 112 and 114 when the trap is being hoisted aboard the fishing vessel, already trapped marine life cannot escape because latch pin 166 prevents ring 114 from falling below 229. The width of netting 228 and diameter of ring 229 enables ring 114 to contact ring 229 and move above latch pin 166 as illustrated in FIG. 10. Then when rope 137 slackens and ring 114 drops toward latch pin 166, the ring 229 and netting 228 follows it downwardly thus preventing escape of even small marine life.

Another problem discovered with the embodiment of the trap shown in FIGS. 1–6 was that the top ring 14 for the side netting tended to move sideways relative to the axis of the rings 12 and 18. In the improved trap disclosed in FIGS. 7–20, this is prevented by means of the vertical guide rods 140 and 142 which are provided on either side of the movable ring 114 on at least four equally spaced quadrants thereof.

One of the advantages of the fish trap shown in FIGS. 1–6 is in the rope connections between the various ring structures which permits a substantially complete collapse of the trap aboard the fishing vessel for storage and transporting thereof. With rigid rods 140 and 142 as provided in the embodiment of FIGS. 7-20, this important feature normally would be lost. However, the inner guide rods 140 are made to be removable while the outer guide rods 142 and 142' are arranged to fold near the center point thereof. This can be seen in FIGS. 16 and 17 wherein a slidable telescopic tube 144 is provided to cover the pivotal joint 146 between the rods 142 and 142'. FIG. 17 shows the joint 146 in greater detail. This pivot joint is arranged so that it can only pivot in the outward direction as shown in FIG. 9 because of the bar member 148 which abuts the ends of rods 142 and 142' which are connected by pivot pins 150 and 150' to a pivot bar 149'. When the sleeve 144 is released by retracting or removing pin 145 so the sleeve can move downwardly to the position shown in FIG. 9, then the rods 142 and 142' may be folded outwardly as in FIG. 9 to permit the top ring 112 to be collapsed upon the other rings therebelow. FIG. 12 shows one type of pivotal mounting for top rod portion 142' which consists of an eye 193 welded to the rod and encircling ring 112. This eye 193 is similar to an eye 194 for the bottom rod 142 which encircles the ring 116 as best seen in FIG. 8 and their width is such that at least two rods will resist movement from any direction of current.

FIG. 13 shows a removable retaining pin 145 which may be provided with a pivotally mounted retention member 147 on the end opposite to the head thereof to retain said pin through appropriate apertures in the sleeve 144 and the upper rod 142'.

FIG. 11 shows a removable latch pin used with the upper portion of pivotal rod 142' for the purpose of positively latching and retaining the upper ring 114 for the side netting in the closed position of the trap once the ropes 143 and 143' have been suitably actuated and lifted by the fishing vessel. One type of latch pin may consist of a square member 160 provided with a suitable aperture 161 at the outer end thereof for engagement through a square aperture 162 within the rod 142'. A retaining pin 163 (similar to the one in FIG. 13) is designed to mate with hole 161 to lock the member 160 removably in aperture 162. The other end of member 160 is provided with a portion 164 having pivotally mounted thereto by pivot pin 165 an extension 166. Spring means, not shown, normally is associated with the pivot point between 164 and 166 and around pivot pin 165 in order to normally keep the member 166 in a horizontal position as shown. However, when the ring 114 is lifted upwardly to close the side netting of the trap, one-way pin member 166 will permit passage of said ring 114 past member 166 and then will snap back to the horizontal to positively retain the ring 114 in the upper closed position. These one-way latch retaining pins 166 which are semi-automatic in operation, together with the side nettings 226 and 228 effectively prevent the escape of trapped marine life from within the trap once it has been closed by lifting the side netting 126 and prior to being brought aboard the fishing vessel. Other types of spring operated one-way latch pins may be used. In order to release the ring 114 and permit netting 126 to move to open position, a spring biased release pin 165' is mounted in underlying relation to pin 166 to normally keep pin 166 horizontal but enable the pins 166 to swing downwardly to release the ring 114 when all of the pins 165' are pulled at a remote location.

FIG. 12 also shows one of the guide eyes 172 for the lifting loop lines 143, 143' appropriately formed and welded within the ring 112 so as to be protected and out of the way. A guide tube 170 is appropriately welded or otherwise fastened to either cross rods 221 or ring 112, or both, and provides the upper support and guide for removable guide rod 140. A removable pin 145' similar to that already described in FIG. 13., may also be used to retain the removable rod 140 as mounted. A lower guide tube sleeve 171, best seen in FIG. 8, similar to that of upper tube sleeve 170 is provided and appropriately mounted from an extension 174 welded to ring 116. As can be readily visualized, the guide rods 140, and 142, 142' when in the erect vertical arrangement as shown in FIGS. 7-10 will form a positive guide channel for movement of ring 114 therebetween and prevent the side movement of said ring and in turn the side netting 126.

When it comes time to collapse the trap upon the deck of the fishing vessel, pins 145' are suitably removed from the at least four rigid guide rods 140 and the respective guide rods 140 removed from their tubular guide sleeves 170 and 171. After removal of the guide rods 140, then the folding rods 142, 142' may be folded as already described. The trap at this point then will be completely collapsible into a very small compact package for transporting and/or storage.

FIG. 15 shows a looped rope 180 tied around bottom cross brace 121 and the looped end 182 is wrapped 1½ times around rings 116 and 118. The loop 182 is used for attachment of the elastic strap 184 with hook 186 thereon for the purpose of maintaining appropriate tension on rope 180 to hold 116 and 118 together. When hook 186 is removed and the trap suspended, the wraps unwind to release rings 116 and 118.

The chemical light 195 as shown in the perspective view of FIG. 14 may be appropriately mounted to the double cross bars 221 by clamp structure 196 and as designed with double opposing reflectors 197 will provide light both toward the center of the trap as well as upwardly away from the trap. Some species of marine life are attracted to light, while others are afraid of light and tend to move away from same. By energizing one portion or the other or both portions of the light of FIG. 14, various species may be encouraged into the trap. When the light is reflecting inside the trap, it will attract species that desire light. When the lifht is reflecting outwardly and the trap is dark, certain species will be attracted to the bait in the dark trap. Bait is suspended on line 190 between the top and bottom of the trap. The light of FIG. 14 is preferably of the chemical type which requires no batteries or electrical source to operate. Such chemical lights are currently available in greenish yellow color but different colors will be used for different depths of water and different species of marine life. In order to vary the color of the light, reflective colored strips are adhesively attached to the inner surface of the reflectors 197. The lamp 195 may be a single or multiple arrangement arranged in any desired location.

Another feature of this embodiment is in the rope ties 180 which hold the bottom ring 118 of the trap which has the central netting thereon removably to the lower ring 116 for the side netting. This feature as disclosed more fully in FIGS. 7-15 and permits either partial or complete release of the bottom trap ring 118 from the side netting ring 116 in order to either completely remove the upper rings from the lower one 118 to release the caught species of marine life thereon, or permits a partial hinge like opening, due to the one or two remaining ties after the first couple of ties have been untied, to permit a dumping of the caught species into the hold of the fishing vessel. This flexibility of release or dumping of the caught fish, crabs and the like, is one of the important features of this type of trap.

FIG. 18 shows how various rings may be wound with rope binding to fill gaps between members to prevent escape of small species and to prevent the metal rings from direct contact with other. This is important from the standpoint of elimination of noise as well as to decrease any electrolytic action between the metals used in the trap.

FIGS. 19 and 20 show the details of the tubular guide sleeves 170 and 171 for the vertical guide rods 140. The vertical guide rods 140 which are removable when it is desired to collapse the trap, has the lower end thereof fitting within the hollow lower tubular portion 171 which is supported by bar 174 attached by welding 175 to ring 116. The upper end of removable guide rod 140 is slidably retained within the hollow sleeve 170 by means of the removable pin 145′, described in greater detail with reference to FIG. 13. These tubular guide sleeves 170, 171 function quite well, and the guide rods 140 provided at each of four points around the respective rings 112 and 116 permit a user of the device to quickly install same when it is desired to set the trap up in erected form ready to be lowered over the side of a fishing vessel and ready to start the trapping operation. They can just as easily and quickly be removed when the trap has been brought aboard the fishing vessel after a period of fishing therewith, and then the trap may be completely collapsed in compact form for storage aboard the vessel. In order to securely retain the trap in collapsed condition during storage, short rods 140′ (FIG. 20) are used as replacements for rods 140 and are secured to sleeves 170, 171 by the same pins 145′. The length of rods 140′ is determined by the distance between the remote ends of sleeves 170, 171 when the trap is collapsed.

Looking at FIGS. 21 and 22, a rigid embodiment of the fish trap of this invention will now be described with FIG. 22 showing only those componensts which are rigidly attached. In these views, the plurality of rings which make up the end and side members of the trap together with the enclosure netting are all labeled with the same reference numerals as used in the embodiment of FIGS. 7–20, but with a prime added thereto. In this embodiment, the removable guide rod 140 has been replaced with a fixed one 240, while the foldable guide rod 142, 142′ has been replaced with a single fixed one 242. These are appropriately welded by welding 175′ to the lower ring member 116′ and the upper ring member 112′. Suitable loop lines 243 connect to the movable ring 114′ in order to raise and lower the side netting as in the first embodiment. Depending additional side nets 226′ and 228′ are also provided as well as the latch pin arrangement 166′ similar to that of the embodiment of FIGS. 7–20. This embodiment has all of the desirable features thereof as to the guiding, closure and latching structure for the side netting rings, but is always in the fully erect large volume state and therefore does not have the desirable features of collapsibility for storage and transporting. However, such a trap will be better for a large boat that does not have a storage problem. Also, it is less costly to build and maintain than the others and has no movement or noise in the rods.

Figure 24:
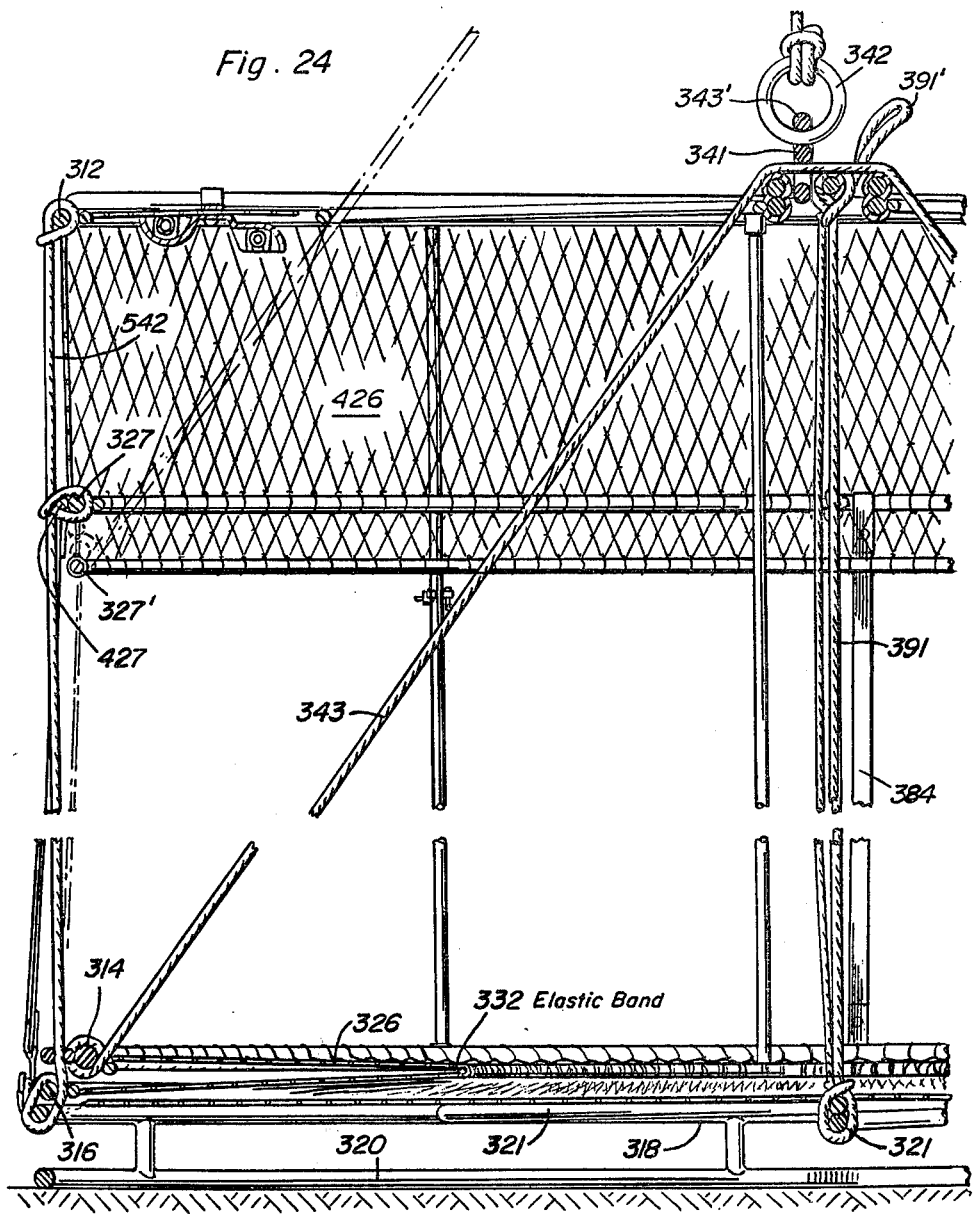
FIG. 24 is a side elevational view, partly in cross section, taken generally along 24—24 of FIG. 23.
Figure 34:
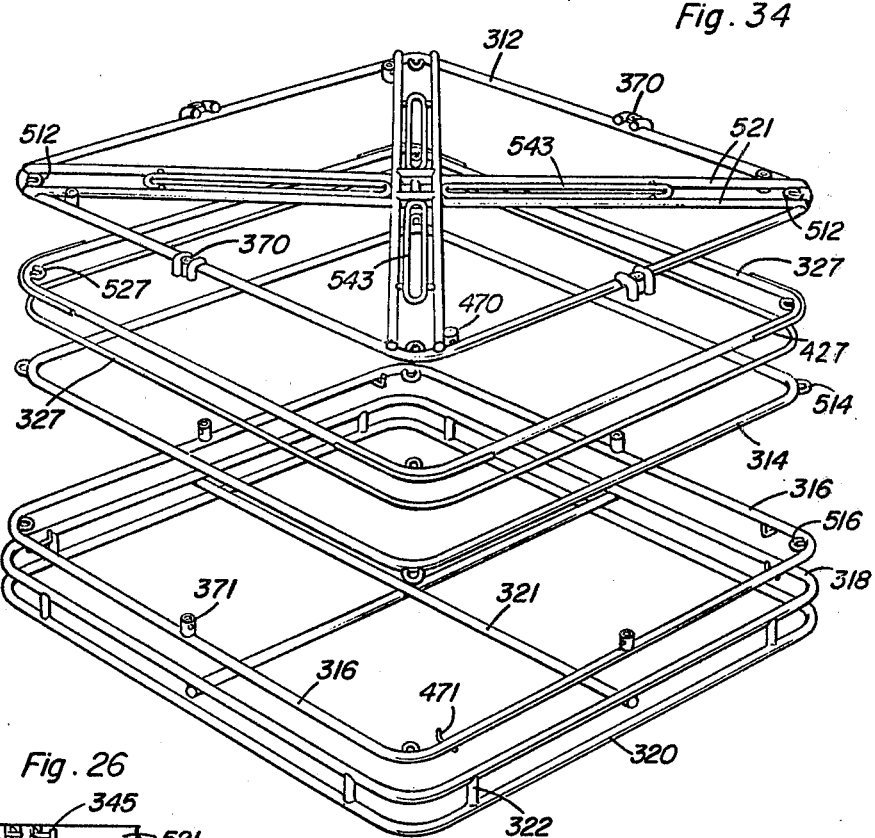
FIG. 34 is a perspective view of the framework structure per se of this embodiment.
Figure 33:
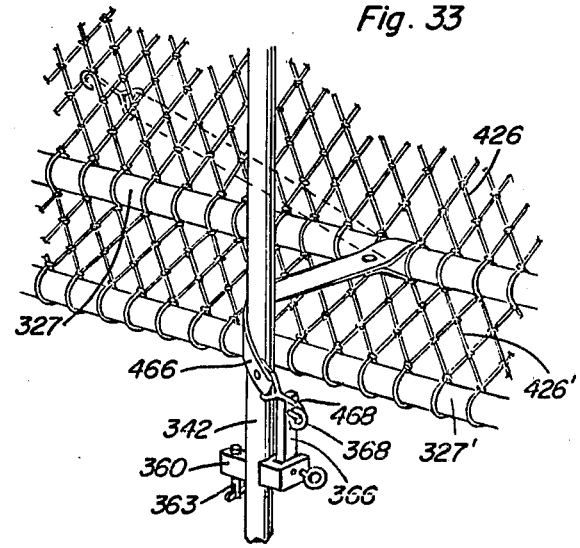
FIG. 33 is a perspective view of the side net strap and retention structure for the latch pin mechanism.

Looking at FIGS. 23–24, this embodiment includes a flat 436 connected to a line 437 which is attached to the double eye terminal member 441 much in the manner of the embodiment of FIGS. 7–20 with the float being only schematically shown since various flat arrangements may be used to compensate for heavy seas. This embodiment is basically a square or rectangular structure having a plurality of formed framework members of square configuration, as perhaps best seen in FIG. 34 without the netting. The upper square 312 is provided with central netting 313 for forming the top planar surface of the trap. Double cross members 521 are welded to the four corners of this structure and are also provided with inner guideways 543 appropriately welded thereto for guiding the loop lines 343 and 343′ which are attached to the upper movable side netting frame 314 much in the manner of the previously described embodiments. Pad eyes 512 are also welded at each of the four corners of this frame structure for appropriate rope attachment. Another weighted square frame member 327 is provided which is attached to the upper depending side netting 426 which forms the protective netting screen between the central netting of the 312 framework and the upper edge of the side netting 326. Another slightly lighter frame member 327′, as best seen in FIG. 24, is normally provided together with side netting 426′ to form an additional relatively short movable portion which contacts with the framework 314 when lifted to the closed position. This is best seen in FIG. 28. When the side netting framework 314 is lifted to closed position it will touch the lower edge of relative light member 327′ and move same with the relatively short portion of additional netting 426′ in an upward direction to completely fill any existing gap. This may be seen in cross section in FIG. 28. It is at this point that framework 314 is also latched in the upper position by means of the latch pin 366 which is identical to that already described in FIG. 11. A square portion 360 fits into an appropriately shaped aperture in the outer guide rod 342 and a retaining pin 363 positively holds such latch pin in mounted position. As best seen in FIG. 33, a resilient strap 466 with a hook 468 may be used to retain the one-way latch pin 366 in the release position against the bias of the internal spring. An eye 368 suitably provided on the pin 366 completes the structure. The purpose of this latch hold to the release position structure is so that on deck the upper framework 314 for the side netting may be worked freely without being held or latched by the pin member 366.

Looking at FIG. 34 again, tubular guide rod holding sleeves 370 may be seen on the top framework 312 while appropriate eyes 512, 527, 514 and 516 are provided with each of the associated square frameworks at the respective corners thereof for engagement with corner ropes 542, as best seen in FIG. 24, for connecting the total trap framework together in a releasable manner. These tie ropes 542 permit the various framework squares to be appropriately adjusted relative to one another in a new and unique fashion and are another important feature of this invention.

The square framework 314 is connected to the upper edge of side netting 326 while the framework 316 is connected to the lower edge of such side netting. Another resilient elastic net band 332 is provided at approximately the center of this side netting to effectively cause the side netting to fold into compact position as best seen in FIG. 24 when the device is opened for initial catching of marine life. FIG. 23 also shows this trap in the open ready for use position with the side netting neatly folded into position. This presents very little in the way of obstructions to marine life.

Figure 31:
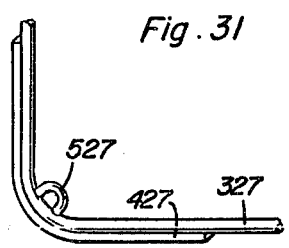
FIG. 31 is a detail of a side net framework reinforced corner with rope guide eye structure.

Outer guide rods 342 fit into the tubular guide sleeves 370 on upper framework 312 and similarly fit into the lower tubular guide sleeves 371 mounted on the lower framework 316. Again, this lower framework 316 is appropriately tied to the framework 318 which has the cover netting across the center thereof for forming the bottom of said trap. Appropriate cross members 321 brace and structurally strengthen this bottom framework. Small supporting studs 322 may be provided for attaching the bottom of the trap to a lower square framework 320 which is the framework member which directly engages with the bottom surface of the body of water which is being fished. This bottom member may be left off in some models of this device and the bottom of the trap, i.e., framework 318 with central netting thereon, may rest directly on the bottom of the water. As best seen in FIG. 31, the weight ring 327 for the side netting 426, has the corners appropriately built up by additional strap material 427 welded thereto. Thus, the rod member 327 which is of slightly smaller outer size than framework 312 is built up by this additional portion 427 so that ring 314 can close without binding on rope 542. FIG. 24 also shows the leftmost corner tie rope 542 as tied at the top, looped about the side skirt ring 327 and then wrapped around rings 316 and 318 and held tight by strap 384. This tie line 542 may also be seen in FIG. 29 which also best shows the loop 544 which is formed by the end of said line for attachment to hook 386.

Figure 26:
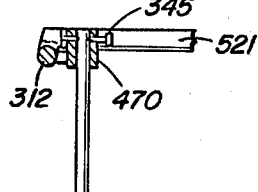
FIG. 26 is a side elevational view of another type of guide support rod.
Figure 27:
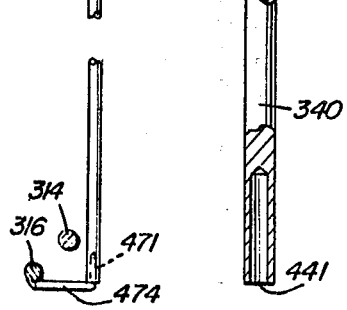
FIG. 27 is an enlarged detail of the lower end of the guide support rod of FIG. 26.

Inner guide rods which are removable are also provided at the respective corners of the framework. These inner removable rods 340 are appropriately supported by a lower pin structure 471 mounted on a bracket 474 appropriately welded to framework 316. FIGS. 26 and 27 best show this mounting and holding structure for the lower end of the guide rods 340. While a pin 471 is provided for reception within the aperture 441 on the lower end of guide rod 340, a reverse structure similar to that of FIG. 20 may be substituted. The upper ends of the inner guide rods 340 are suitably held and guided by the tubular sleeves 470 which are appropriately welded inside of the corners of square framework 312. In the embodiments shown these tubular guide sleeves are also welded to the cross rods 521 for additional strength and rigidity. A removable pin 345 similar to 145 already described in the previous embodiments also is used to retain each of the respective inner guide rods 340 in their mounted position.

FIG. 30 shows the double eye terminal end which is attached to line 137 or 437 of the various embodiments for assuring that the line loops 343 and 343' will always be separated from each other and will not tend to interfere or entangle with each other. Also, this double eye terminal end permits the two single loops 343 and 343' to be connected to the appropriate corners of the raisable framework 314 and will be self-centering in a semi-automatic nature as line 437 is lifted. That is, it has been discovered that when single lines are attached to a single connecting ring for line 437, as in the parent application devices, there was a tendency to exert more force on one outer edge of the raisable framework than the other and get a tilting of the side netting with a partial gap left at the opposite side thereof. This defect has been cured by the arrangement of the double loop lines 343 and 343' together with the double eye terminal end 341 as shown in FIG. 30 insuring equal tension of ropes 343 and 343' regardless of conditions encountered.

Figure 32:
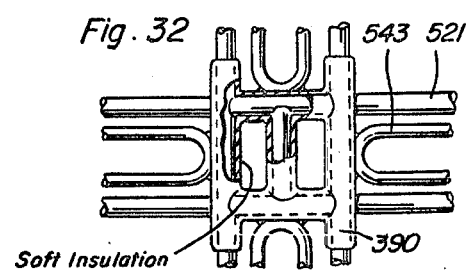
FIG. 32 is a top plan view of the double cross bars with insulating covering.

FIG. 32 shows the connection of the cross bar members 521 with the central guide channels 543 as appropriately welded and connected together being covered with a soft insulating coating 390 over the central area thereof. This covering will reduce any noise when current and seas move rope 437 and double eye terminal 441. The elongated shape of channel 543 is important since it permits ropes 343 and 343' to have no bends. When this trap is stored, short rods replace the outer removable rods thus assuring that the trap remains intact. A rope 391 (FIG. 24) extends between the middle of the bottom braces and top braces and terminates in a loop 391' for lifting the trap so that lifting forces are exerted on both the top and bottom of the trap.

While the latter embodiment has been shown as being of square nature, it may also be rectangular, elliptical, triangular, or various other common as well as uncommon shapes without departing from the inventive features disclosed herein. Similarly the other embodiments while shown in round shape, also may be square or any of the other configurations mentioned above. The important inventive features are the top and bottom enclosures, the side enclosure structure which is movable from an open ready for trapping position to a closed after trapping position together with the additional side netting enclosure structure, as well as the guide channel structure of rigid, semi-rigid or completely collapsible form for assuring that the operating framework for the side netting will function in the manner intended. Also, in the semi-rigid and flexible versions of this invention, the device permits complete collapse thereof into a very small flat package for storage and transporting.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A trap for marine life and the like comprising: a top planar enclosure means, a bottom planar enclosure means, guiding means for connecting the top enclosure means with the bottom enclosure means, and side enclosure means associated with the guiding means and mounted for movement between a position wherein the sides of the trap are open and a position where the sides are enclosed, means connected to the side enclosure means to move it to closed position from a remote location when lifting the trap and retain it in closed position, said guiding means including a plurality of outer guide members spaced around the outside of said top planar enclosure means, likewise spaced around the outside of said bottom planar enclosure means, and enclosing the side enclosure means therewithin to prevent any substantial lateral displacement thereof.

2. The structure as set forth in claim 1, wherein the guiding means further includes a plurality of inner guide members connected between the top planar enclosure means and the bottom planar enclosure means, and so associated with the side enclosure means as to form guide channels with the outer guide members to permit movement of said side enclosure means relative thereto.

3. The structure as set forth in claim 2, wherein at least some of the plurality of outer guide members and inner guide members are permanently attached to the top enclosure means.

4. The structure as set forth in claim 3, wherein at least some of the plurality of outer and inner guide members are removably associated with the top planar enclosure means.

5. The structure as set forth in claim 4, together with an elastic member associated with the side enclosure means to aid in the collapse thereof to the open position.

6. The structure as set forth in claim 2, wherein at least some of the plurality of outer and inner guide members are removable while the others are foldable.

7. The structure as set forth in claim 6, wherein the inner guide members are rods removably mounted between the top planar enclosure means and the bottom planar enclosure means, and the outer guide members are foldably arranged and pivotally connected to each of said top and bottom enclosure means.

8. The structure as set forth in claim 7, together with tubular guide sleeves connected to the top planar enclosure means and the bottom planar enclosure means for removably receiving the inner guide rods therewithin, and a retaining pin associated therewith for positive retention of said guide rod when mounted therewithin.

9. The structure as set forth in claim 8, together with a one-way pivot joint structure for the outer foldable guide members, and a slidable sleeve on said foldable guide member which when positioned over the one-way pivot joint will positively prevent the folding action thereof.

10. The structure as set forth in claim 2, wherein the inner guide members consist of rod elements which are removably mounted between the top and bottom enclosure means, and tubular holding sleeves are provided therefor on said top and bottom enclosure means.

11. The structure as set forth in claim 2, wherein the top enclosure means is provided with a plurality of cross bars for rigidity of the enclosure means and for hoisting and transporting the trap.

12. The structure as set forth in claim 11, together with a two-way lamp attached to said cross bars to illuminate the upper outside of said trap and to illuminate downwardly the bait as mounted within said trap.

13. The structure as set forth in claim 1, together with rope means connected to the side enclosure means for the operation of same from one position to the other, said rope means consisting of two lines connected at their respective ends to opposite portions of the side enclosure means, and crossing each other at the middle thereof at approximately right angles to each other, and a double eye terminal end mounted on said cross loops for attachment to a lifting line to provide equalized lifting action and to prevent direct contact of said ropes with each other.

14. The structure as set forth in claim 1, together with additional side enclosure means associated with the top enclosure means to engage with and partially cover the said first enclosure means when moved to the closed position of the trap.

15. The structure as set forth in claim 1, together with an elastic means associated with the side enclosure means for assuring an untangled collapse of said side enclosure means when moved to the position where the sides of the trap are open.

16. The structure as set forth in claim 1, together with means for partially to completely disengaging the bottom enclosure means from the guiding means and side enclosure means to permit caught marine life to be discharged from the trap.

17. The structure as set forth in claim 1, wherein said bottom enclosure means includes a first annular member connected to the bottom of the side enclosure means, a second annular member having net thereon defining a closure for the bottom of the trap, means releasably connecting said first and second annular members to enable the bottom of the trap to be opened.

18. The structure as set forth in claim 17, wherein said releasable connecting means includes a rope anchored to the bottom portion of the trap and looped around said annular members, said rope terminating in an eye on the free end, and a resilient strap attached to the top enclosure means and including a hook on the free end engaged with the eye on the rope to releasably retain the rope looped around the first and second annular members.

19. The structure as set forth in claim 1, together with latch pin structure associated with the outer guide members for engagement with the side enclosure means in order to latch same in the closed position of the trap once moved thereto until the trap can be brought aboard the fishing vessel.

20. The structure as set forth in claim 19, together with soft insulating means covering portions of the trap structure to prevent galvanic action as well as noise.

21. The structure as set forth in claim 20, together with means for partially to completely disengaging the bottom enclosure means from the guiding means and side enclosure means to permit caught marine life to be discharged from the trap.

22. The structure as set forth in claim 20, wherein said bottom enclosure means includes a first annular member connected to the bottom of the side enclosure means, a second annular member having net thereon defining a closure for the bottom of the trap, means releasably connecting said first and second annular members to enable the bottom of the trap to be opened.

23. The structure as set forth in claim 22, wherein said releasable connecting means includes a rope anchored to the bottom portion of the trap and looped around said annular members, said rope terminating in an eye on the free end, and a resilient strap attached to the top enclosure means and including a hook on the free end engaged with the eye on the rope to releasably retain the rope looped around the first and second annular members.

24. A trap for catching marine life comprising: an upper frame member with planar netting covering same, a lower frame member with planar netting covering same, means for supportively connecting said upper and lower frame member in separated position for forming the top and bottom portions of the trap, at least two more frame members mounted between the upper and lower frame members, said netting connecting said two additional frame members, means for releasably attaching one of said side netting frame members to the lower frame member, means for lifting said other side netting frame member towards the upper frame member, and further guiding and alignment means associated therewith for preventing substantial displacement of said side netting frame member from the desired position between the upper and lower frame members.

25. The structure as set forth in claim 24, wherein the further guiding and alignment means includes a plurality of guide rods connected between the upper and lower frame members and enclosing the side netting frame members therewithin and ropes extending between said upper and lower frame members, said ropes being received by eyes on said side netting frame members.

26. The structure as set forth in claim 25, together with attachment means connected to the means for lifting the other side netting frame member with an evenly distributed force thereto.

27. The structure as set forth in claim 26, wherein the frame members are square in shape, double cross bars on the uppermost square frame members, said lift means including a pair of lines connected between the upper side netting frame member and crossing each other at substantially right angles above the cross bars and means on said upper frame member receiving said lines, said means being in the form of elongated channels formed in said cross bars to retain the lift lines straight when raising and lowering the upper side netting frame member.

28. The structure as set forth in claim 27, together with a double eye terminal end member with the eyes mounted at 90° to each other and separate therefrom, one of said lifting lines passing through one of said eyes, and the other of said lifting lines passing through the other of said eyes so that the force equalizing effect may be achieved by hoisting on the double eye terminal and from an appropriate lifting line as associated with a fishing vessel.

29. The structure as set forth in claim 27, together with chemical light means mounted on said cross bars for illuminating the trap and surrounding waters.

30. The structure as set forth in claim 24, together with additional side netting means suspended from the uppermost frame member and engageable with the movable side netting frame member for completely enclosing the sides of said trap when in the fully closed position.

31. The structure as set forth in claim 24, together with means for permitting the lower planar netting frame member to be partially or completely disengaged from the lower side netting frame member.

32. The structure as set forth in claim 27, together with latch pin means associated with the guide rods for positively retaining the upper side netting frame member in the fully closed position once placed thereinto by the lifting lines.

33. A trap for crabs, fish, and other marine life comprising: a number of large cylindrical rings, at least two of said rings having netting covering the center area of each said ring, at least two of said rings having side netting attached around the circumference thereof, and means to secure said rings together so that in one position said side netting is collapsed to permit marine life to enter the trap to secure bait therein and in another position said side netting is extended to completely enclose the marine life and prevent the escape thereof from the trap, and an annular elastic member around the center of the side netting to effect the collapse thereof, said elastic member being stretched when the side netting is extended and collapsing the side netting inwardly at the center thereof when the rings having the side netting attached thereto are in adjacent relation.

34. The structure as set forth in claim 33, wherein another bottom ring is provided below the lower one of the center net covered rings for supporting the trap off the bottom of the surface being fished.

35. The structure as set forth in claim 34, wherein the uppermost ring is one of the rings having the center area covered with netting and said ring is supported horizontally in the water being fished by suitable floats attached thereto.

36. A trap for crabs, fish, and other marine life comprising: a number of large cylindrical rings, at least two of said rings having netting covering the center area of each said ring, at least two of said rings having side netting attached around the circumference thereof, and means to secure said rings together so that in one position said side netting is collapsed to permit the marine life to enter the trap to secure bait therein and in another position said side netting is extended to completely enclose the marine life and prevent the escape thereof from the trap, an elastic member around the center of the side netting to effect the collapse thereof, another bottom ring provided for supporting the trap off the bottom of the surface being fished, and the means to secure all the rings together comprise ropes attached to the rings having the center areas thereof covered by netting.

37. The structure as set forth in claim 36, wherein said means further include additional ropes which are not under tension when the trap is open for catching marine life but are operable from the surface and put under tension to close the trap.

38. The structure as set forth in claim 37, wherein the ropes for closing the trap are connected to a float on the surface by means of additional connecting lines.

39. A trap for crabs, fish, and other marine life comprising: a number of large cylindrical rings, at least two of said rings having netting covering the center area of each said ring, at least two of said rings having side netting attached around the circumference thereof, and means to secure said rings together so that in one position said side netting is collapsed to permit the marine life to enter the trap to secure bait therein and in another position said side netting is extended to completely enclose the marine life and prevent the escape thereof from the trap, and an additional bottom ring below the lower ring having the center area covered with netting for supporting the entire trap above the bottom surface of the area to be fished.

40. A trap for crabs, fish, and other marine life comprising: a number of large cylindrical rings, at least two of said rings having netting covering the center area of each said ring, at least two of said rings having side netting attached around the circumference thereof, and means to secure said rings together so that in one position said side netting is collapsed to permit the marine life to enter the trap to secure bait therein and in another position said side netting is extended to completely enclose the marine life and prevent the escape thereof from the trap, an additional bottom ring for supporting the entire trap above the bottom surface of the area to be fished, and the two rings having the center areas thereof covered with netting are connected by at least three ropes attaches at each end to one of said rings and wherein the means for collapsing the side netting includes a large elastic member around the center portion of said netting.

41. The structure as defined in claim 40, together with additional lines for closing the trap, said lines being connected by additional lines to a float on the surface of the water being fished.

42. A trap for crabs, fish, and other marine life comprising: a number of large cylindrical rings, at least two of said rings having netting covering the center area of each said ring, at least two of said rings having side netting attached around the circumference thereof, and means to secure said rings together so that in one position said side netting is collapsed to permit the marine life to enter the trap to secure bait therein and in another position said side netting is extended to completely enclose the marine life and prevent the escape thereof from the trap, and the means for securing said rings together are completely releasable on the deck of a fishing vessel to permit the trap to be separated for easy access to the marine life caught therein.

43. A trap for crabs, fish, and other marine life comprising: a number of large cylindrical rings, at least two of said rings having netting covering the center area of each said ring, at least two of said rings having side netting attached around the circumference thereof, and means to secure said rings together so that in one position said side netting is collapsed to permit the marine life to enter the trap to secure bait therein and in another position said side netting is extended to completely enclose the marine life and prevent the escape thereof from the trap, and the means to secure the rings together are at least partially releasable on the deck of a fishing vessel to permit a portion of the trap to separate for easy transfer of the marine life caught within said trap into the hold of the fishing vessel.

44. A trap for marine life comprising: a first annular member having a net enclosing the center area thereof to form the top portion of the trap and having means for supporting said member in a horizontal position when in the water being fished, second and third annular members, a sleeve net, one end of said sleeve net being attached to the second annular member and the other end of said sleeve net being attached to the third annular member, resilient means about the center of said sleeve net for collapsing same when said second and third annular members are permitted to be close together, means for supporting said second and third annular member, a fourth annular member having a net covering the center area thereof to form the bottom of said trap, and means for releasably connecting during fishing operations the third and fourth annular members so that the bottom member may be opened to discharge the entrapped marine life.

45. The structure as set forth in claim 44, wherein the means for releasably connecting during fishing operations the third and fourth annular members include rope ties between said members.

46. The structure as set forth in claim 45 wherein the means for supporting the second and third annular member includes lines appropriately spaced and tied between said members.

47. The structure as set forth in claim 46, wherein the resilient means for collapsing the sleeve net includes an annular rubber member of substantially less diameter when unstretched than the diameter of the said annular members.

48. The structure as set forth in claim 47, wherein the means connected to the first member includes a plurality of float balls appropriately spaced around the first annular member and flexibly attached thereto.

49. The structure of claim 48, together with rope lines appropriately spaced around the second annular member and passing through retaining eyes appropriately spaced around the first annular member and connected by a further line to a surface buoy.

50. The structure as defined in claim 2 wherein said top enclosure means includes light means mounted thereon, said light means including a self-contained chemical light.

51. The structure as defined in claim 50 wherein said light includes means to vary the color of the light and direct the light in a desired pattern to more efficiently catch different species of marine life at different depths.

52. The structure as defined in claim 28 wherein the cross bars on the uppermost frame member have portions coated with soft insulating material to retain the least possible slack in the lift lines thereby reducing relative movement between components of the trap in rough seas and reducing noise produced by contact between trap components and reducing entanglement and facilitating lifting of the trap from the sea.

53. The structure as defined in claim 8 together with a shorter rod extending between the secured to the sleeves on the top planar enclosure means and the bottom planar enclosure means when the inner guide rods are removed for fixedly securing the top and bottom enclosure means in adjacent relation for retaining the trap in collapsed condition for storage.

54. The structure as defined in claim 19 wherein said latch pin structure includes a pivotal pin mounted on said outer guide means and normally disposed horizontally in the path of movement of said side enclosure means, said pin being pivotal upwardly about a horizontal axis to permit the side enclosure means to pass above the pin with the pin being biased towards its horizontal position.

55. The structure as defined in claim 54 together with releasable means connected with said latch pin to support it in horizontal position, remote means connected to said releasable means to move it to inoperative position thus permitting the latch pin to pivot downwardly to enable the side enclosure means to move downwardly to open position.

* * * * *